(12) United States Patent
Russo et al.

(10) Patent No.: US 8,720,466 B2
(45) Date of Patent: May 13, 2014

(54) PROCESS FOR ACCESSING UNDERGROUND PRESSURIZED GAS MAIN

(75) Inventors: Frank Russo, Swiftwater, PA (US); Robert Bentzoni, Brooheadsville, PA (US); Lawrence Dowling, Gilbert, PA (US); Stephen Karner, Bangor, PA (US)

(73) Assignee: Tellus Underground Technologies, Inc., Portland, PA (US)

( * ) Notice: Subject to any disclaimer, the term of this patent is extended or adjusted under 35 U.S.C. 154(b) by 80 days.

(21) Appl. No.: 13/569,842

(22) Filed: Aug. 8, 2012

(65) Prior Publication Data

US 2014/0041732 A1 Feb. 13, 2014

(51) Int. Cl.
*F16L 41/04* (2006.01)
*B23B 41/08* (2006.01)

(52) U.S. Cl.
USPC ..................... 137/15.14; 137/318; 405/184.1

(58) Field of Classification Search
USPC .......... 137/15.12, 15.14, 317, 318; 405/184.1
See application file for complete search history.

(56) References Cited

U.S. PATENT DOCUMENTS

| 4,332,272 | A | * | 6/1982 | Wendell | 137/318 |
| 6,142,166 | A | * | 11/2000 | Kuzan et al. | 137/15.14 |
| 6,286,542 | B1 | * | 9/2001 | Morain et al. | 137/317 |
| 7,350,533 | B1 | * | 4/2008 | Teodosio | 137/15.12 |

* cited by examiner

*Primary Examiner* — Kevin Lee
(74) *Attorney, Agent, or Firm* — Paul & Paul

(57) ABSTRACT

A process is provided for accessing an underground pressurized gas main for retirement of replacement of the connection of a gas service pipe thereto. A gas main fixture that has a service tee adaptor and a pressurized chamber connected thereto is mounted onto the gas main with the tee adaptor above a tee plug on the gas service pipe. The chamber is closed against gas discharge and the tee plug is unscrewed from the gas service pipe while the pressure chamber is closed. The tee plug is removed through the service tee adapter and pressure chamber while minimizing gas discharged to atmosphere. The plug hole is preferably reamed through the pressure chamber while the chamber is closed to atmosphere, tapped for a straight fine thread, and a main plug with the fine thread is screwed into the tapped hole while limiting its depth of engagement.

14 Claims, 9 Drawing Sheets

PROCESS FOR ACCESSING UNDERGROUND PRESSURIZED GAS MAIN

BACKGROUND OF THE INVENTION

1. Field of the Invention

This invention is directed to a method for accessing an underground pressurized gas main for retirement or replacement of a saddle-mounted gas service pipe that is connected to the gas main while the gas main is under operating pressure.

2. Description of the Related Art

Underground pipes can be accessed through a hole that, at ground level, is small relative to the distance that the underground pipe, such as a gas main is located beneath the surface of the ground. This is sometimes referred to as "keyhole" excavation.

In most cases, the ground is first excavated, preferably by a vacuum excavation system, so that the gas main becomes uncovered, particularly at a location along the gas main where a gas service pipe, for example a saddle-mounted gas service pipe, is connected to the gas main, and through which the gas service pipe is connected to a household, a business, etc., for providing gas service thereto. U.S. Pat. Nos. 6,618,966; 6,669,406; 7,018,137 and 7,241,084 represent U.S. patents that facilitate "keyhole" excavation, for use in excavation situations in which the depth of the pipe to be accessed underground is substantially greater than the size of the excavation opening at ground level. The complete disclosures of said patents are herein incorporated by reference.

It is also known in the art of accessing underground pressurized gas mains that when a gas service pipe is to be removed from the gas main, either for purposes of retiring that gas service, or to replace the gas service with an alternative service, to do the same in such a way that avoids a rapid dissipation of gas from the gas main, an explosion, or the like.

A rapid dissemination of gas from the gas main is considered a gas "blow", which is highly undesirable in that it may damage personnel, equipment, and in worse cases, can create a fireball or explosion.

Consequently it is desirable to work on the gas main for removal or retirement of the connection of a gas service pipe to the gas main under controlled conditions that minimize escape of gas from the gas main while such work is ongoing.

SUMMARY OF THE INVENTION

The present invention is directed to a process for accessing an underground pressurized gas main for retirement or replacement of the connection of a gas service pipe thereto. The invention comprises the steps of evacuating an opening in the ground, preferably a "keyhole" opening, to access that portion of the underground pipe having the gas service pipe connected thereto, mounting a gas main fixture that has a service tee adapter and a pressurized chamber connected thereto onto the gas main so that the service tee adapter is above a tee plug on the connection of the gas service pipe to the gas main, closing the pressure chamber against gas discharge to atmosphere and unscrewing the tee plug from the gas service pipe while the pressure chamber is closed to atmosphere and removing the tee plug through the service tee adapter and pressure chamber while limiting gas discharge to atmosphere to only an amount of main gas that is in the pressure chamber, preferably reaming a plug hole in the gas main through the pressure chamber and service tee adapter while the pressure chamber is closed to atmosphere, tapping a straight fine thread in the plug hole in the gas main through the pressure chamber and service tee adapter while the pressure chamber is closed to atmosphere, and screwing into the tapped hole a main plug that has a straight, fine screw thread sized to mate with the tapped thread of the plug hole by screwing the main plug into the tapped hole while limiting its depth of engagement in the tapped hole and while the pressure chamber is closed to atmosphere.

Accordingly, it is a primary object of this invention to accomplish the above steps by tapping a straight, fine thread in the plug hole, and then screwing a main plug into the thus tapped hole while limiting its depth of engagement in the hole.

It is a further object of this invention to accomplish the above object, wherein a flange on the main plug limits the depth of screwed engagement of the main plug in the gas main.

It is a further object of this invention to accomplish the above object, wherein the plug hole in the gas main is first reamed under conditions in which the pressure chamber is closed to atmosphere, and to do so prior to tapping the thread in the plug hole.

It is yet another object of this invention to accomplish the above objects, wherein the bottom of the main plug, once installed in the gas main, is substantially snag-free to avoid substantial interference during cleaning of the gas main by use of a "pig" or other cleaning tool that may be used to clean the gas main from inside, or inspected with a camera.

It is a further object of this invention to accomplish the above objects, followed by the step of clamping a band around the gas main over the main plug, when the gas service is to be retired from that location along the gas main.

It is a further object of this invention to accomplish a number of the above objects, wherein another gas service is to be connected to the gas main at the location where the gas service has been removed from the gas main, that includes the step of unscrewing the main plug from the gas main through a pressure chamber while the pressure chamber is closed to atmosphere.

It is yet another object of this invention to accomplish the above objects, wherein the evacuation includes providing an opening in the ground at ground level that is substantially smaller than the depth of the gas main below ground.

Other objects and advantages of the present invention will be readily apparent upon a reading of the following brief descriptions of the drawing figures, the detailed descriptions of the preferred embodiments, and the appended claims.

BRIEF DESCRIPTIONS OF THE DRAWING FIGURES

FIG. 14 is a perspective illustration of a next step in the clamping operation to which FIG. 13 is addressed.

DETAILED DESCRIPTIONS OF THE PREFERRED EMBODIMENTS

Figure 1:
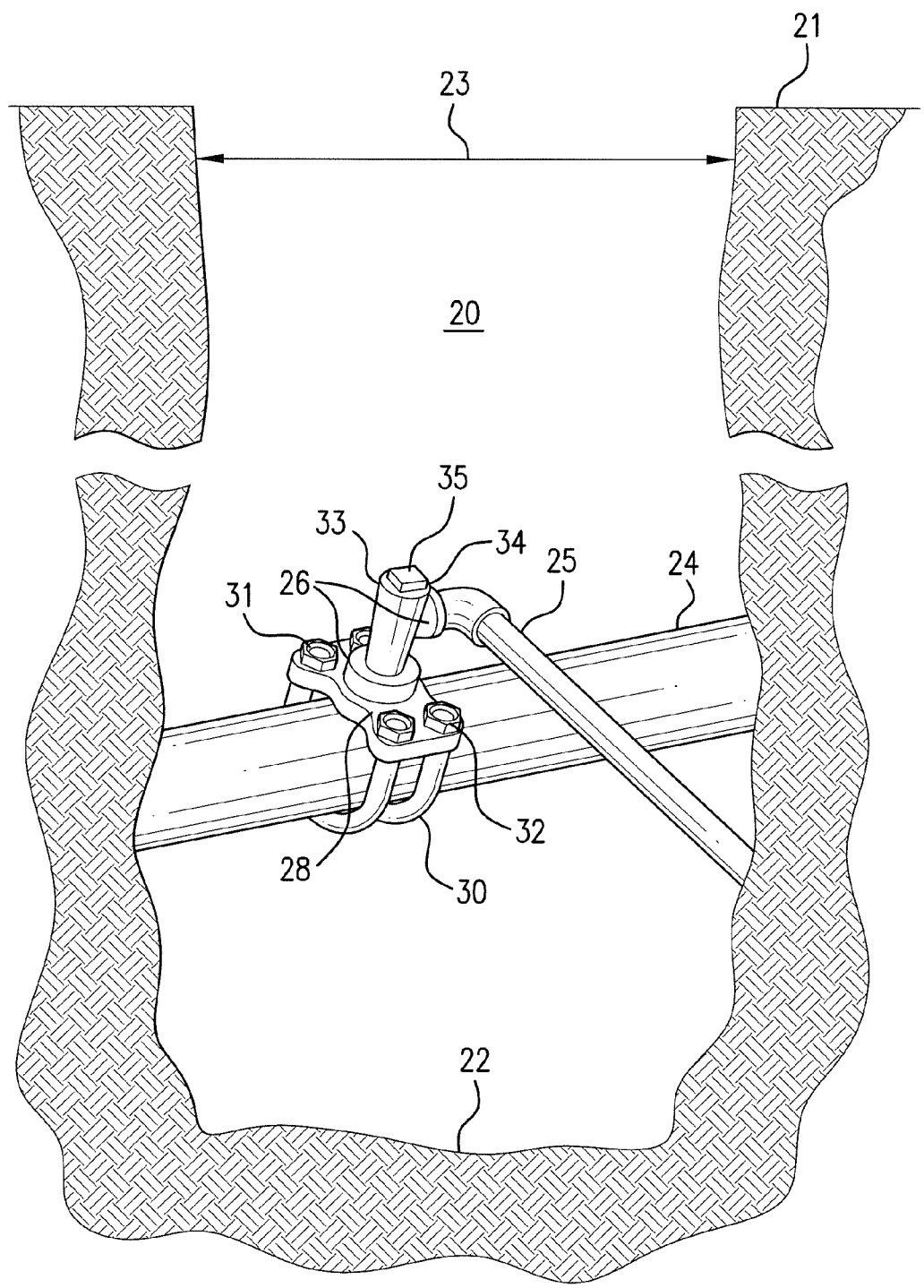
FIG. 1 is an illustration of a portion of a gas main that has been excavated by means of a "keyhole" excavation, to reveal the connection of a gas service pipe thereto by means of a gas service pipe mounted thereon.

Referring now to the drawings in detail, reference is first made to FIG. 1, in which there is an underground hole generally designated by the numeral 20, extending from ground level 21, down to a level 22 at the bottom of the hole. The hole 20 is known as a "keyhole" excavation, because its depth 22 relative to ground level 21 is substantially greater than the opening 23 at ground level 21. Generally, the depth 22 will be several feet or more below ground 21, whereas the opening 23 at ground level may be on the order of 18 inches, more or less.

The sides of the opening 20 are partially fragmentally illustrated, to demonstrate that the hole 20 can be of various depths.

Generally the hole 20 will have been excavated by means of vacuum excavation, at a location where a gas main 24 has a gas service pipe 25 connected thereto providing gas service to a house, business establishment or the like, at a suitable location, by means of a connection 26.

Typically, the main 24 will carry gas under pressure, for example, anywhere from 10 p.s.i to 100 p.s.i., and more typically about 65 p.s.i.

In the embodiment for the gas service connection 26 of FIG. 1, it will be seen that the connection 26 includes a plate 28, and a number of threaded U bolts 30, and in the illustration of FIG. 1, two such bolts 30 are shown, having their upper ends 31 through clearance holes in the plate in threaded engagement with nuts 32 on the plate. A vertical portion 33 of the connection 26 has a plug 34 in threaded engagement at its upper end, with the upper end of the plug 34 being configured for a wrench to be engaged therewith, for screwing and unscrewing the same into the pipe 33.

While the connection 26 is shown in clamped engagement with the main 24 in FIG. 1, it will be understood that other means of connecting the service pipe connection 26 to the main 24, such as welding or the like may have been used to connect the service line 25 to the main 24.

Figure 2:
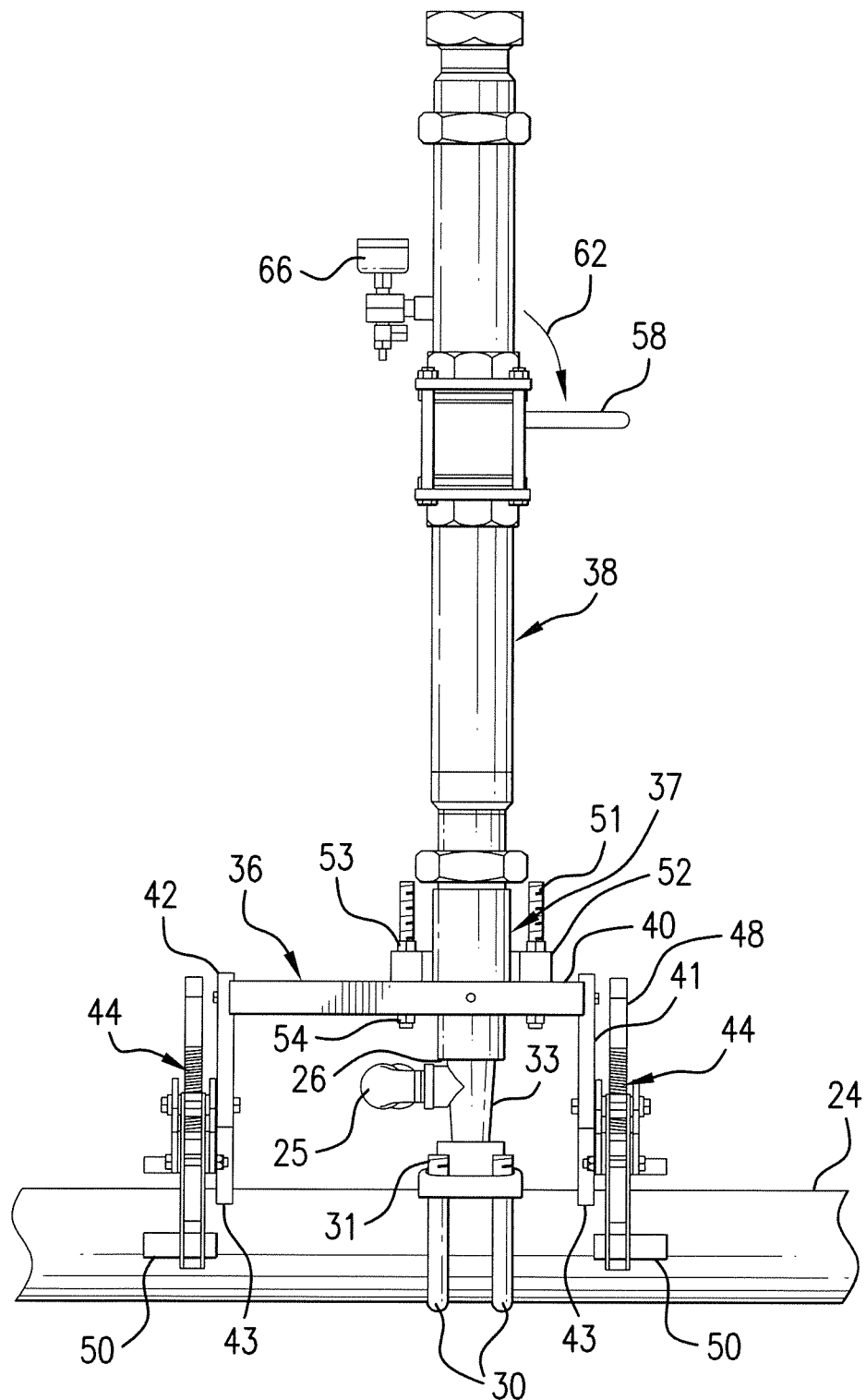
FIG. 2 is a vertical elevational view of a portion of a gas main having a gas service pipe connected thereto, to which a gas main fixture is connected, straddling a service tee adapter carried by the fixture, and to which a pressure chamber is attached, in accordance with this invention.

With reference now to FIG. 2, it will be seen that a gas main fixture 36 straddles the service pipe connection 26, and carries a service tee adapter 37 at its lower end. The service tee adapter 37 overlies the upper end of the vertical pipe 33 of the service connection 26, as shown in FIG. 2.

The fixture 36 includes a horizontal plate 40 and end plates 41 and 42 connected thereto, the lower ends 43 of which are arcuately configured, to fit against the circumference of the gas main 24.

Figure 3:
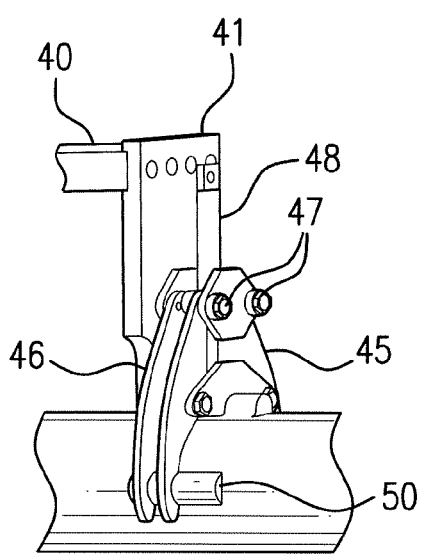
FIG. 3 is a slightly enlarged, fragmentary illustration of the manner in which the gas main fixture is engaged with the gas main, by means of pivot-mounted arms carried by the fixture, and in engagement around the gas main.

Clamping mechanisms 44 are, in turn, mounted outside the vertical plates 41, 42, and, in turn, mount pivotal arms 45, 46, on pivots 47 as shown in FIG. 3, and upstanding rods 48 are threaded at their lower ends, so that when an elongate wrench is inserted into the hole 20 to engage the upper ends of the rods 48, turning the same from above ground, threaded lower ends on the rods 48 will cause the pivot arms 45, 46 to move toward the main 24, such that clamping pads 50 will be in clamped engagement against sides of the gas main 24, preferably below the centerline of the main 24, in order to securely mount the fixture 36 on the gas main 24.

By reversing the operation and turning the rods 48 in an opposite direction, the clamping mechanisms 44 can be unclamped from the main 24 when it is desired to remove the fixture 36 from the gas main 24.

The pressure chamber 38 is attached to the horizontal plate 40 of the fixture 36 by means of suitable threaded posts 51 mounted in bosses 52 carried by the plate 40, and fastened by means of appropriate upper and lower nuts 53, 54.

Once the pressure chamber 38 and service tee adapter 37 and fixture 36 are mounted as described above onto the gas main 24, various tools may now be used to perform various functions relative to the gas main 24, under conditions of controlled pressure, in order to prevent a release of gas from the gas main 24 into the atmosphere.

The first such operation would be the unscrewing of the plug 35 from the top of the vertical pipe 33 illustrated in FIG. 1. This is done by inserting a tool having an elongate rod (not shown) into the upper end 55 of the pressure chamber 38, and with that rod having a wrench at its lower end adapted to engage the upper end of the plug 35 and unscrew the same from the generally vertical pipe 33. The rod is slid into the upper end 55 of the vacuum chamber, through an annular seal 56 therein down to a location just above the ball valve 57 in the chamber 38. At that point, the lever 58 that operates the rotation of the ball valve 57 is rotated upwardly in the direction of the arrow 60, until the lever 58 is generally vertical, allowing the tool to then be pushed downwardly through a then vertically disposed bore 61 in the ball valve, so that the wrench end (not shown) of the rod, at the lower end of the rod may engage the nut 35 at the upper end of the pipe 33, unscrewing the same from the pipe 33, with the tool then be vertically lifted out of the chamber 38, having the threaded cap 35 carried therewith. It will be noted that the lower end of the rod that engages the threaded cap 35 may be magnetic, to assure that the plug 35 can be carried up through the pressure chamber 38, with the rod, as the rod is being removed from the pressure chamber 38.

Figure 6:
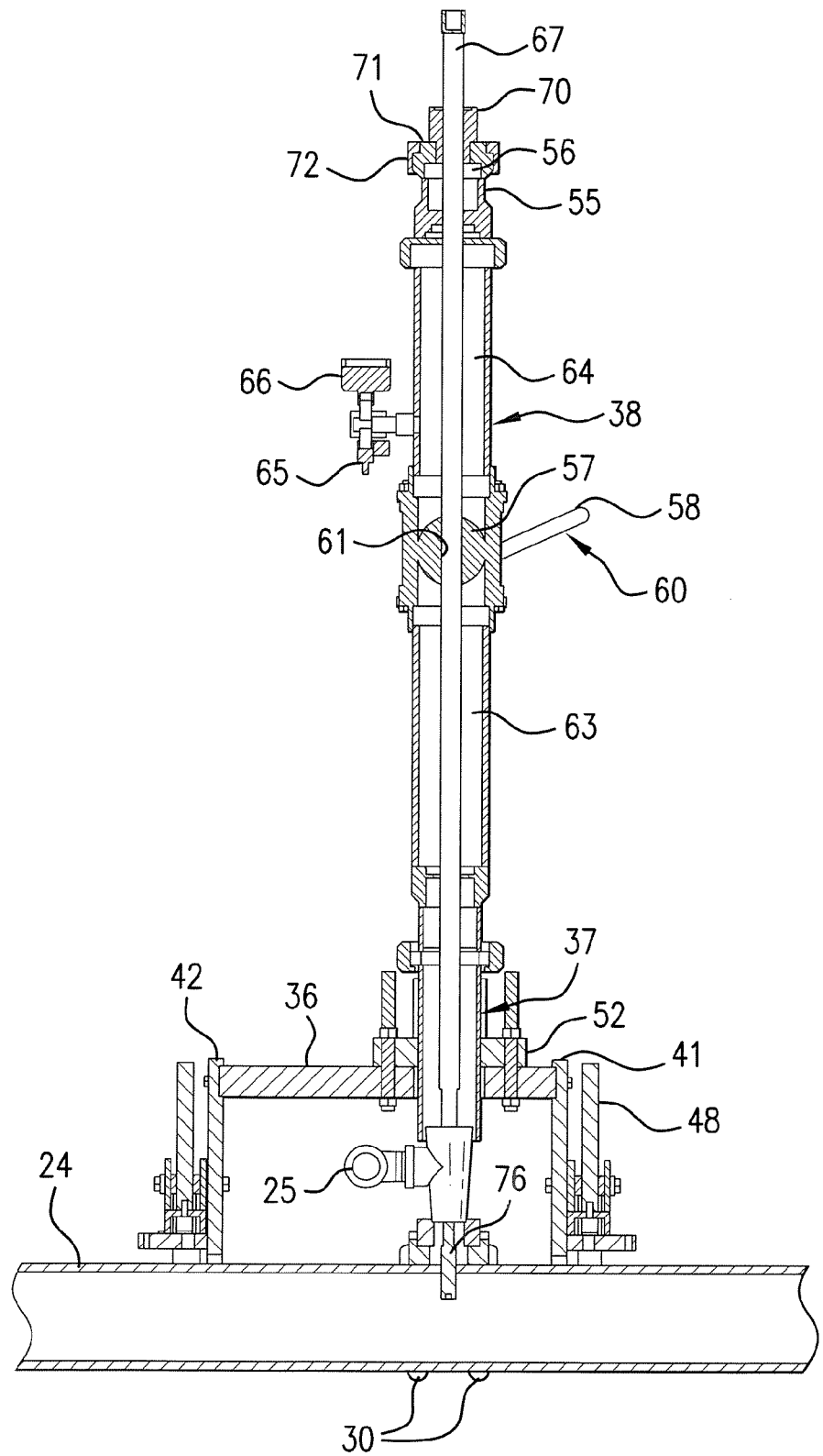
FIG. 6 is a vertical sectional view, taken through the gas main, the gas main fixture, the service tee adapter and pressure chamber, illustrating the operation of the tapping tool of FIG. 5.

With the plug 35 removed, gas from the gas main 24 is now free to pass out of the main 24, into the pressure chamber 38, due to a presence of a preexisting hole in the gas main directly beneath the plug 35. Thus, as soon as the plug 35 is lifted upwardly at a vertical location in the pressure chamber 38 immediately above the ball valve 57, the lever 58 is then rotated in the direction of the arrow 62 shown in FIG. 2, until it is horizontal, as shown in FIG. 2, closing off the bore 61 by moving it into a horizontal position, such that gas from the gas main 24 can only enter the lower zone 63 of the pressure chamber 38, below the ball valve 57. With the gas main pressure thus contained into only the lower zone 63 of the pressure chamber 38, below the ball valve 57, the rod holding the wrench at its lower end may now be slid upwardly at the upper end of the pressure chamber 38 and out of the pressure chamber, taking the seal 56, boss 70 with flange 71 with it, after removal of the threaded nut 72, after opening a valve 65 at the lower end of a pressure gage 66 shown in FIG. 6, to release any minimal amount of gas that has entered the upper zone 64 of the pressure chamber 38 during removal of the plug 35.

The hole in the gas main 24 that was below the plug 35, can now be reamed in preparation for it being tapped to accommodate a threaded plug therein. In order to ream the hole, a reaming device, illustrated in FIG. 4, 67 having a reaming tool 68 at its lower end may now be inserted into the upper end 55 of the pressure chamber 38, through the seal 56, in the same manner that the tool discussed above that had a wrench at its lower end was inserted through the pressure chamber 38. In doing so, the valve 65 will now be closed, closing off the upper interior portion 65 of the pressure chamber 38 to atmosphere, and as the reaming tool 68 approaches the ball valve 57, the lever 58 will now, once again, be moved vertically upwardly, in the direction of the arrow 60 of FIG. 6, so that the bore 61 is once again vertical, in order to accommodate receipt of the rod 67 with the reaming tool 68 carried thereby therethrough, to pass through the lower zone 63 of the pressure chamber, down through the pipe 33, with the rod 67 being rotated from above ground to ream out the hole in the gas pipe 24.

In order to have the seal 56 in snug engagement against the periphery of the rod 67, or any other tool-carrying rod inserted through the vacuum chamber 38, a boss 70 slideable along the rod, has a flange 71 engaged by an internally threaded ring 72, to squeeze the seal 56 into tight but slideable engagement with the exterior of the rod 67 or any other rod thus inserted.

The reaming tool is thus inserted with appropriate opening and closing of the valves 65, 57, as described above with respect to the rod that carries the wrench for removing the plug 35, for both entry and removal of the rod 67 in order to accomplish the reaming function.

It will thus be apparent, that as various tools are inserted and removed through the pressure chamber 38, such are done with minimal release of gas, in that only gas from the gas main 24 that is present in the lower zone 63 of the pressure chamber becomes released, and no gas is released directly from the gas main 24 to atmosphere, such that there is no rapid dissipation of gas from the gas main, nor any explosion.

After the reaming operation is completed, the now-reamed hole in the gas main can now be tapped to accommodate a screw thread. Thus, another rod 73 also with a slideable sealing boss 74 and flange 75 may be used, carrying a tapping tool 76 at its lower end, to tap a thread in the hole that has been reamed in the gas main 24. The rod 73 with the tapping tool 76 carried thereby will thus move through the pressure chamber 38, as described above with respect to the reaming tool 67 and the tool that removed the plug 35, with suitable opening and closing of the valves 65, 57, as described above.

It will be understood that the valves 65, 57 may take on other forms alternative to those described above. For example, the ball valve 57 could, if desired, be a gate valve or any other valve suitable for controlling the opening and closing of the pressure chamber as described above.

The tapping tool 76 that is used to tap a thread in the hole at the top of the gas main 24 will be a tap that can tap a straight (cylindrical) fine thread in the plug hole, adapted to have a tight fit with a straight, fine, screw thread on a plug to be inserted therein.

Typically, a gas main 24 may be of a diameter that is 2 to 4 inches, or more, and typically can have a wall thickness for the main that is on the order of 0.140 inch.

In accordance with this invention, the plug 80 is one having a fine thread (Unified National Fine), in order to maximize the amount of the screw thread 81 on the circumference of the plug that is in engagement with the relatively thin wall of the gas main. Furthermore, because the portion of the gas main having the hole in which the plug 80 is to be inserted in threaded engagement is arcuate, rather than being a flat plate, the amount of threaded engagement between the plug and the tapped hole is not the same at all portions around the periphery of the plug. It has been found, for a gas main wall thickness of 0.140 inch, a straight fine thread for the plug can have essentially three threads in engagement with the wall of the gas main, that has essentially 85% of its thread in threaded engagement with the tapped hole.

While it is rather standard that gas mains carry a gas pressure on the order of up to about 200 p.s.i., in accordance with the present invention, even with a gas main wall thickness of 0.115 inch, plugs in accordance with the present invention can withstand 500 p.s.i. of gas pressure without failure. A pressure range in which a plug in accordance with the instant invention is a pressure range between 300 p.s.i. and 500 p.s.i., with an engagement between the thread on the plug and the thread in the tapped hole that is tight, is one in which there is minimal "play" or tolerance in the fit between the plug thread and tapped thread.

Figure 8:
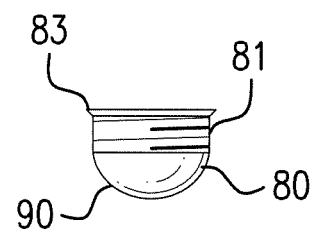
FIG. 8 is a side elevational view of a main plug in accordance with this invention.
Figure 9:
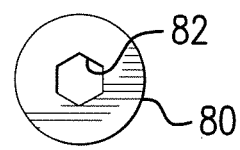
FIG. 9 is a top view of the main plug of FIG. 8.
Figure 10:
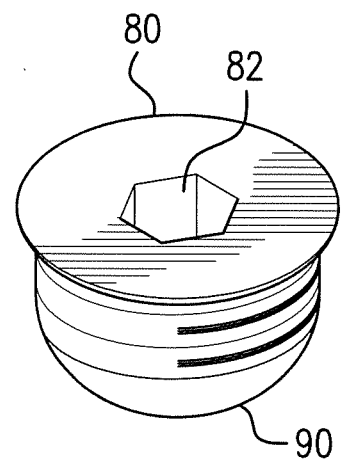
FIG. 10 is an enlarged, perspective view of the main plug of FIGS. 8 and 9.

The plug 80 in accordance with this invention has an opening 82 in its upper end, for accommodating a wrench. In the embodiment illustrated in FIGS. 8-10, the opening 82 is to accommodate the end of a male hex wrench therein, for screwing the plug 80 into the tapped hole. Such may, if desired be a six-sided hex opening 82, as shown, or any other opening that will accommodate any wrench suitable for screwing the plug into the hole.

The upper end of the plug 80 also has a peripheral flange 83, such that, when the plug 80 is screwed into the tapped hole, the flange 83 will limit the depth of penetration of the plug into the tapped hole in that the flange 83 will engage against the outer surface of the wall of the gas main. The flange 83 can come to a point, as shown, in which case, the upper end of the tapped hole may be chamfered. Alternatively, the flange 83 could be flat, in which case, the bottom of the flange would engage against the outer surface of the main, also limiting the depth of penetration of the plug 80 into the tapped hole.

Figure 4:
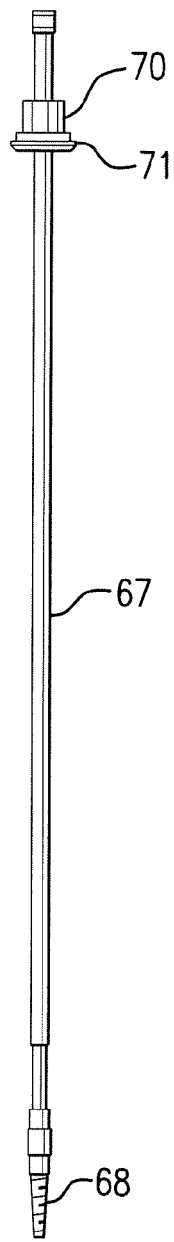
FIG. 4 is an elevational view of an elongate rod carrying a reaming tool at the lower end thereof, and adapted to be inserted through a pressure chamber and service tee adapter, to open, enlarge or clean a hole in the gas main.
Figure 5:
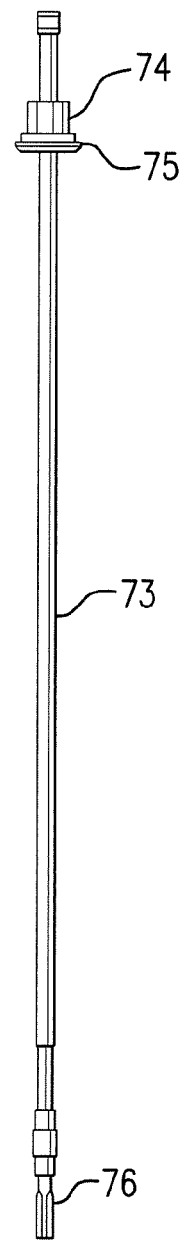
FIG. 5 is an illustration similar to that of FIG. 4, but wherein the lower end of the rod carries a tapping tool for tapping a threaded hole in the gas main when inserted through the pressure chamber and service tee adapter.
Figure 7:
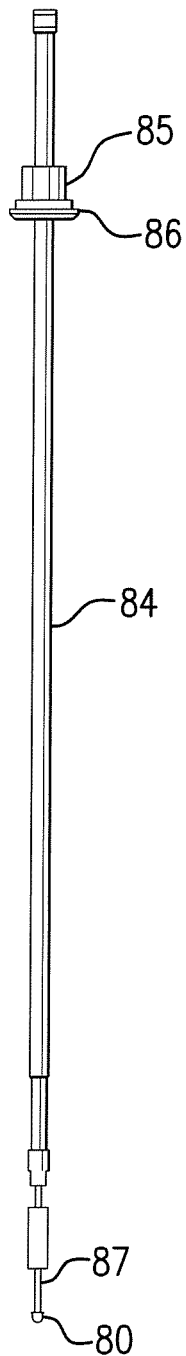
FIG. 7 is an illustration similar to those of FIGS. 4 and 5, but wherein the tool of FIG. 7 carries a main plug for insertion through the pressure chamber and service tee adapter, in order to plug the tapped hole in the service main.
Figure 11:
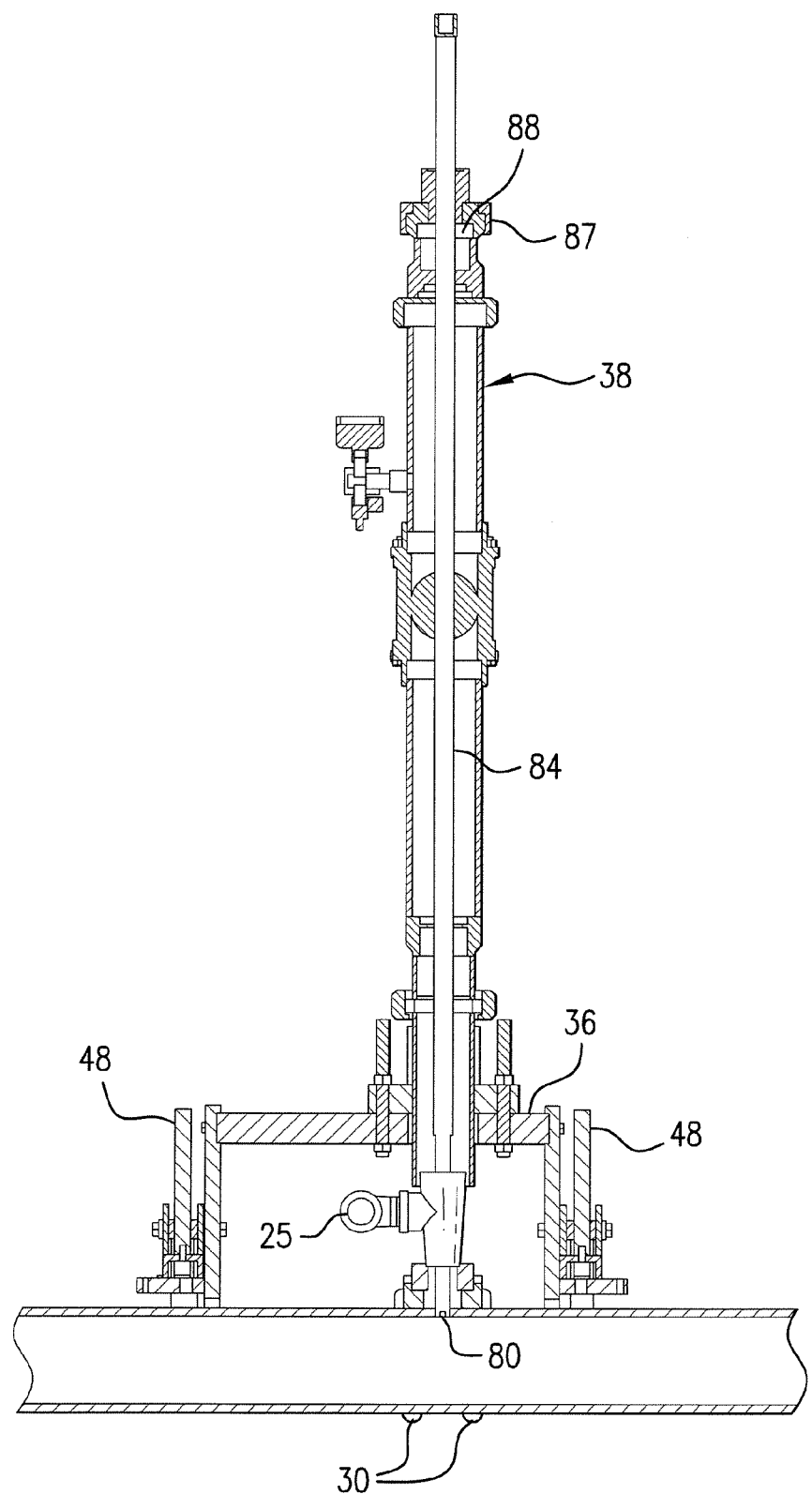
FIG. 11 is an illustration somewhat similar to that of FIG. 6, but wherein the rod that carries the main plug has been inserted through the pressure chamber and service tee adapter to plug the hole in the main.
Figure 12:
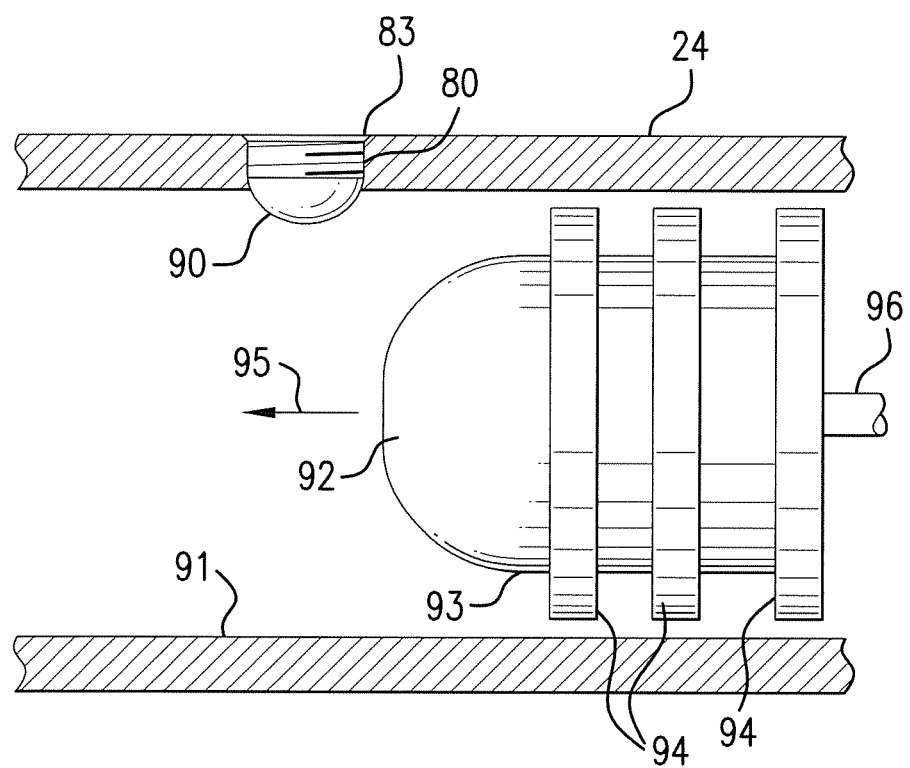
FIG. 12 is an enlarged, fragmentary illustration of a cleaning "pig" for insertion through the interior of the gas main, and illustrating the manner in which the bottom surface of the main plug is arcuately configured to be substantially snag-free relative to the movement of a pig therepast as the pig is driven through the interior of the gas main.

With reference to FIGS. 7 and 11, it will be seen that the rod 84 has a slidable boss 85 at its upper end, also with a flange 86, as with the rods for the tools shown in FIGS. 4 and 5, with a threaded clamp member 87 being used to squeeze the seal 88 against the outer surface of the rod 84 as the rod is inserted into the chamber 38. The plug 80 is carried by an Allen wrench or the like 87 that may also magnetically connect the plug 80 with the Allen wrench 87 that is carried, in turn, at the lower end of the rod 84.

The insertion and removal of the rod 84 carrying the plug 80 will be as described above for the tool that removes the plug 35 from the gas service, and as the rods 67 and 73 that carry the reaming tool 68 and tapping tool 76, respectively, with the valves 57, 65, being opened and closed as described above with respect to those other tools.

With reference to FIGS. 8-10 and 12, it will be noted that the lower end 90 of the plug 80, is arcuately configured, or somewhat rounded. This is to avoid snagging any cleaning or scraping equipment from being caught on the plug 80, possibly damaging the same, as the gas main 24 is being cleaned or inspected.

Typically, the manner in which a gas main is cleaned, is to drive a tool often called a "pig" longitudinally through the gas main, to scrape any accumulation that may have occurred from the inner wall 91 of the gas main. Typically such a pig will have a body 92, often with a cylindrical exterior 93, having a plurality of scrapers 94 mounted on its periphery, and may be driven through the gas main 24, for example, as indicated by the arrow 95, due to force applied through a drive shaft 96, that pushes the pig 92 through the gas main. The scrapers 94 may be comprised of brushes, leather discs, semi-flexible plastic or the like, so that they are able to scrape the interior wall 91 of the main 24. By having an arcuate lower end 90 for the bottom of the plug 80, the presence of the plug 80 in the wall of the gas main 24 precludes snagging portions of a "pig" or other cleaning or inspection mechanism that is driven through the main 24.

With reference now to FIGS. 13-16, if the service is to be retired from connection to the gas main, it is desirable to provide a band around the portion of the gas main having the plug therein. In accordance therewith, a gripping rod 100, operated from above ground, carries a generally flexible but rectangular strap 101, having an opening 102 therein, with the rod or other holder device 100 moving the strap 101 into position beneath the gas main 24, and carrying a band 103 with connecting bolts 104 and latch devices 105, in turn, being carried by the band 103.

Figure 13:
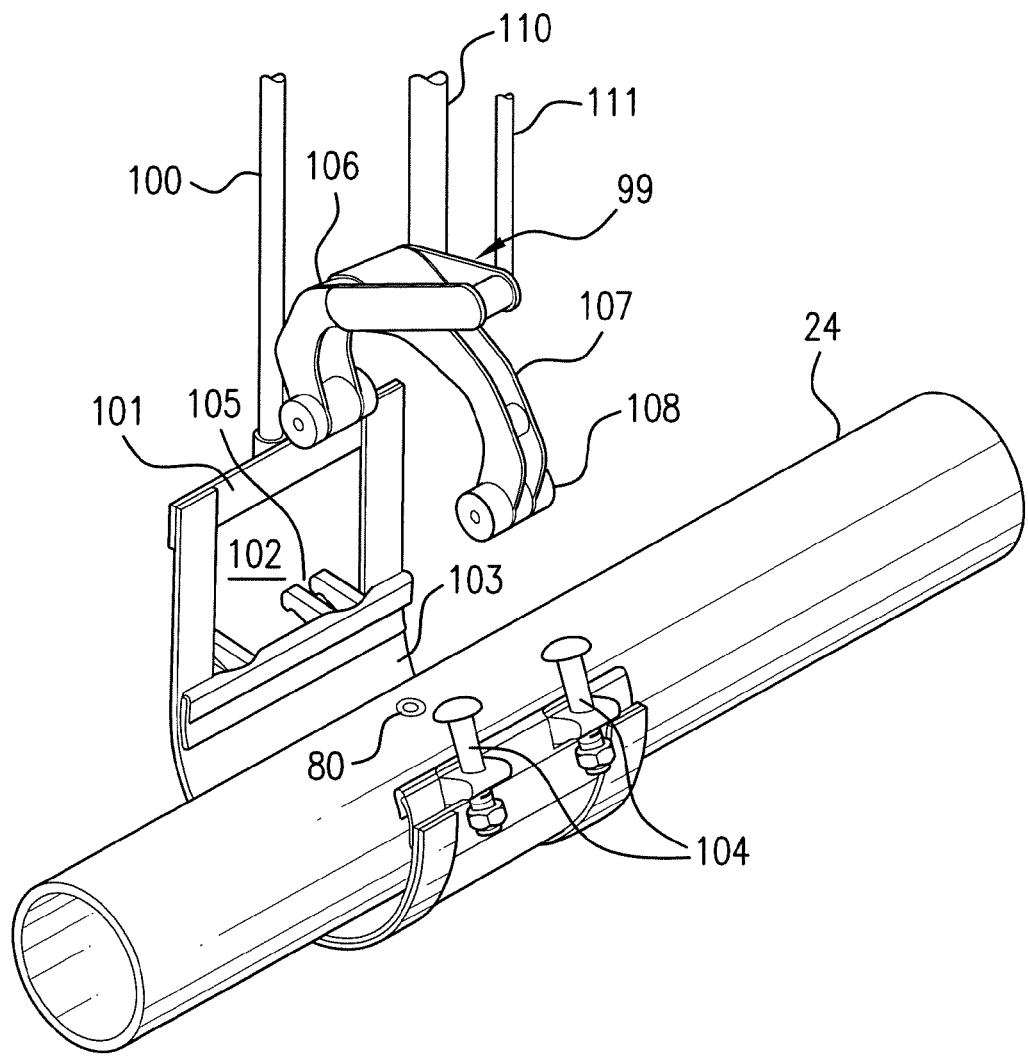
FIG. 13 is a perspective illustration of the gas main with the main plug having been inserted therein, illustrating the clamping of a band around the gas main over the main plug.
Figure 14:
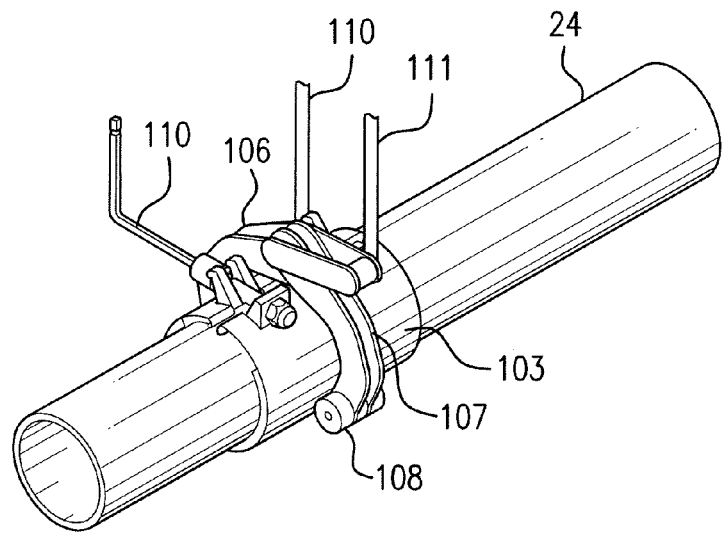
Figure 15:
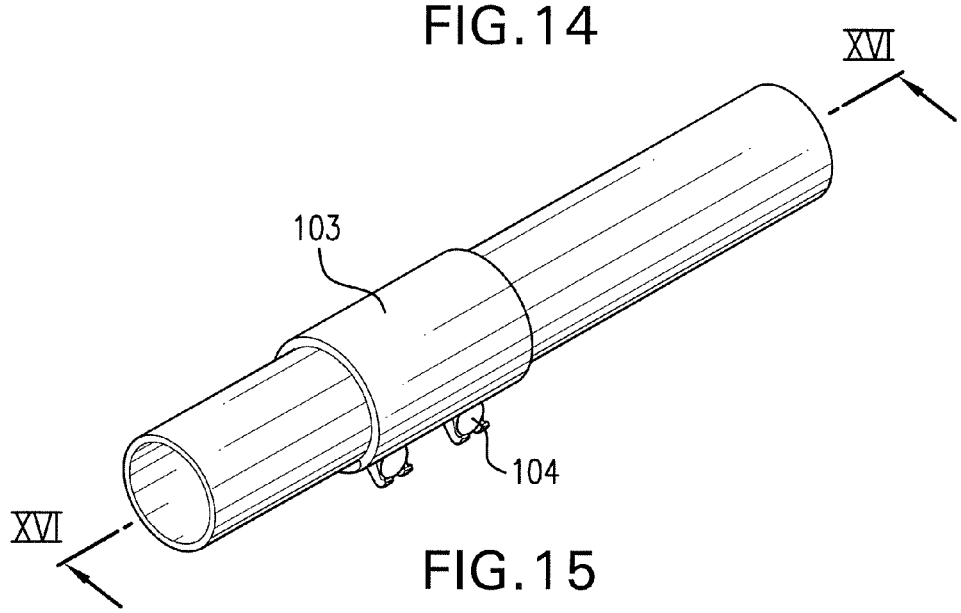
FIG. 15 is a perspective illustration of the gas main with the band clamped around it over the main plug, and wherein the band has been rotated around the gas main so that its connection is beneath the gas main.
Figure 16:
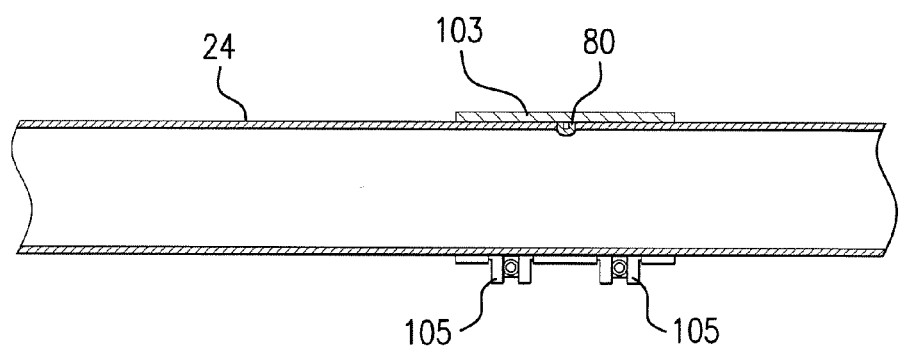
FIG. 16 is a vertical cross-sectional view taken through the gas main with the clamped band thereabout, over the main plug, taken generally along the line 16-16 of FIG. 15.

The rod or other mechanism 100 moves the strap 101 into position, as shown. A jaw mechanism 99 having a pair of pivotally mounted jaws or pushers 106, 107, with rollers 108 at their lower ends, are moved downwardly by means of a holder rod 110, to engage the outside of the band 103, as shown, and another rod 111, also operated from above ground, is movable in threaded engagement (not shown) with upper ends of the jaw mechanism 99, and when turned from above ground, causes the pivoting of the jaws or arms 106, 107, to occur, for closing or opening the jaws depending upon the direction that the rod is turned. When the jaws are pivoted toward the gas main they push the band 103 around the exterior of the gas main 24, as shown in FIG. 13 so that a hex wrench or the like, operable from above ground, may fasten the bolts 104 into the latches 105 until the band 103 is almost tightly clamped to the gas main 24. Then, the rods 110, 111, being controlled from above ground, may rotate the band 103 about 180° around the wall of the gas main 24, so that the clamps and bolts 104, 105 are below the gas main 24, as shown in FIGS. 15 and 16.

The rods 110, 111, at this point are removed, taking the pivot clamps 106, 107 therewith.

If it is not desired to retire the gas service from connection to the gas main, but to replace the same, a replacement service connection may be made by essentially reversing the various steps described above, to place a new gas service onto the gas main through a pressure chamber 38, as shown, using tools operated from above ground in a manner similar to that described above, after removal of the plug 80 from its threaded engagement within the tapped hole, to facilitate flow of gas from the gas main, through a service connection, into a service pipe, including applying a plug above the new service line, similar to the plug 35 illustrated in FIG. 1.

It will be apparent from the foregoing that various modifications may be made in the structure and operation of the equipment used for accomplishing the processes in accordance with the instant invention, all within in the spirit and scope of the invention as defined in the appended claims.

What is claimed is:

1. A process for accessing an underground pressurized gas main for retirement or replacement of a gas service pipe connection that is connected to the gas main under gas main operating pressure, without creating a gas blow, comprising the steps of:

(a) evacuating an opening in the ground to access an underground gas main and connected gas service pipe;

(b) providing a gas main fixture, a service tee adapter and pressure chamber;

(c) connecting the service tee adapter to the pressure chamber and to the gas main fixture;

(d) then mounting the gas main fixture with the connected service tee adapter and pressure chamber onto the gas main so that the service tee adapter is above a tee plug on the gas service pipe connection and with the pressure chamber in substantial alignment above the tee plug on the gas service pipe connection;

(e) then closing the pressure chamber against gas discharge to atmosphere and while the pressure chamber is closed to atmosphere, unscrewing the tee plug from the gas service pipe connection and removing the tee plug through the service tee adapter and pressure chamber while limiting gas discharge to atmosphere to only an amount of main gas that is in the pressure chamber;

(f) then reaming a plug hole in the gas main through the pressure chamber and service tee adapter while the pressure chamber is closed to atmosphere;

(g) then tapping a straight, fine thread in the plug hole in the gas main through the pressure chamber and service tee adapter while the pressure chamber is closed to atmosphere;

(h) providing a main plug having a straight, fine screw thread sized to mate in a tight fit with the tapped thread of the plug hole and a flange at its upper end to engage the outside of the gas main and thereby limit the depth of threaded engagement of the main plug into the gas main;

(i) then screwing the main plug into the tapped plug hole in the gas main in a tight fit engagement with the tapped hole until its flange is disposed against the outer surface of the gas main, through the pressure chamber and service tee adapter while the pressure chamber is closed to atmosphere; and (j) then removing the gas main fixture, service tee adapter and pressure chamber from the gas main.

2. The process of claim 1, wherein the engagement of clause (i) is such that the screw thread of the main plug is at least 80% engaged with the tapped thread of the plug hole.

3. The process of claim 1, wherein the engagement of clause (i) is sufficient to retain the main plug thread in engagement with the tapped hole thread under a gas main pressure in the range of 300 p.s.i to 500 p.s.i.

4. The process of claim 1, wherein the providing step of clause (h) includes providing the main plug with an arcuate bottom at its lower end to provide a smooth surface inside the gas main to facilitate substantially snag-free cleaning or inspection of the gas main and to facilitate centering of the main plug into the tapped hole at the beginning of entry of the main plug into the tapped hole.

5. The process of claim 2, wherein the engagement of clause (i) is sufficient to retain the main plug thread in engagement with the tapped hole thread under a gas main pressure in the range of 300 p.s.i to 500 p.s.i.

6. The process of claim 5, wherein the providing step of clause (h) includes providing the main plug with an arcuate bottom at its lower end to provide a smooth surface inside the gas main to facilitate substantially snag-free cleaning or inspection of the gas main and to facilitate centering of the main plug into the tapped hole at the beginning of entry of the main plug into the tapped hole.

7. The process of claim 1, including the step of clamping a band around the gas main over the main plug to retire the gas service from that location on the gas main.

8. The process of claim 2, including the step of clamping a band around the gas main over the main plug to retire the gas service from that location on the gas main.

9. The process of claim 3, including the step of clamping a band around the gas main over the main plug to retire the gas service from that location on the gas main.

10. The process of claim 1, including replacing a gas service connection onto the gas main at the location on the gas main where the main plug was applied, including the step of unscrewing the main plug from the gas main through a pressure chamber while the pressure chamber is closed to atmosphere.

11. The process of claim 2, including replacing a gas service connection onto the gas main at the location on the gas main where the main plug was applied, including the step of unscrewing the main plug from the gas main through a pressure chamber while the pressure chamber is closed to atmosphere.

12. The process of claim 1, including the step of clamping a band around the gas main over the main plug to retire the gas service from that location on the gas main.

13. The process of claim 2, including the step of clamping a band around the gas main over the main plug to retire the gas service from that location on the gas main.

14. The process of any one of claims 1-13, wherein the evacuating step includes providing an opening in the ground at ground level that is substantially smaller than the depth of the gas main below ground.

* * * * *